UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

ENAMEL LACQUER OR VARNISH COMPOSITION.

1,102,632.     Specification of Letters Patent.     Patented July 7, 1914.

No Drawing.     Application filed July 22, 1911. Serial No. 639,944.

*To all whom it may concern:*

Be it known that I, JONAS W. AYLSWORTH, a citizen of the United States, and a resident of East Orange, county of Essex, and State of New Jersey, have invented certain new and useful Improvements in Enamel Lacquer or Varnish Compositions, of which the following is a description.

My invention relates to an enamel or varnish composition which may be hardened by heat treatment, and my object is the production of such a composition having certain valuable and novel characteristics and properties to be hereinafter set forth.

My present invention is an improvement upon that described and claimed in my application, Ser. No. 543,239, filed Feb. 11, 1910, Enamel lacquer or varnish.

In my French Patent No. 436,192, entitled Phenolic condensation product and process for manufacturing the same, demanded Feb. 11, 1911, and published March 20, 1912, I disclose a baking enamel or varnish composition of a similar character. The composition there set forth comprises a fusible, soluble phenol-formaldehyde condensation product incorporated with a suitable proportion of a methylene-containing hardening agent therefor, such as hexa-methylene-tetra-amin, dissolved in a suitable volatile solvent for the same, such as alcohol. Also, if desired, an ingredient may be added to the mass which will act as a solid solvent or plasticity ingredient in the product after the same has been hardened and rendered infusible by application of heat. The fusible soluble phenolic condensation product referred to as an ingredient, was described in my said French patent as preferably comprising a material which I term a phenol resin, in which the formaldehyde is entirely combined with the phenol and the phenol is all combined with the formaldehyde or only a small and determinable proportion of the phenol is left uncombined. The phenol resin and certain methods of preparing the same are also fully described in my U. S. Patent No. 1,029,737, granted June 18, 1912. In place of this phenol resin, however, various of the fusible soluble phenolic condensation products known as "shellac substitutes" may be used. In lacquers or enamels of this character which are to be used for purposes of electrical insulation it is quite important that the solvent ingredient should be a water free solvent which is not the case with wood alcohol, methylated spirits, acetone, and most of the solvents mentioned in my French patent. The Belgian patent does, however, refer to the possibility of using a non-water containing solvent for the ingredients, such as refined fusel oil, or oil of mirbane. These latter solvents, however, are not described in my pending U. S. application referred to.

My present invention comprises a composition which, because of the solvent employed, is an improvement over that described in my previous application referred to for insulating and other purposes in which the presence of water is harmful. I have found that acetylene-tetra-chlorid is especially valuable as a solvent for such compositions, that the same is absolutely water-free and that when it is used, a much better product results. I have discovered that this material is perfectly soluble in the phenol resin or other fusible soluble phenolic condensation product used as an ingredient of the varnish and that it is a good solvent for the methylene-containing hardening agent for the phenol resin, when used in certain proportions. Also the acetylene-tetra-chlorid is volatile at ordinary temperatures and at the same time its boiling point is sufficiently high so that any trace of it which may be left in the enamel or lacquer film has no injurious action and does not cause any bubbling when heated to a temperature necessary to harden the film. Furthermore, the acetylene-tetra-chlorid has no disagreeable odor and is a non-inflammable solvent.

My invention contemplates the use of acetylene-tetra-chlorid as the preferred solvent for the composition, although other water free solvents, such as amyl alcohol, refined fusel oid, oil of mirbane, absolute ethyl or methyl-alcohol, may be used as solvents in combination with the acetylene-tetra-chlorid, advantageously. Some of the advantages of my invention, but not all, may be realized, if one or more of these water-free solvents are used without the acetylene-tetra-chlorid. Because of its combination of valuable properties, however, I consider acetylene-tetra-chlorid as the best material for the purpose.

The necessary ingredients of my new composition are a fusible soluble phenol resin or equivalent shellac substitute, a suitable methylene containing hardening agent for the phenol resin and a water free volatile solvent, such as described, preferably acetylene-tetra-chlorid, alone or with small percentages of water-free volatile solvents such as those mentioned. The phenol resin referred to, and which I prefer to use, is fully described in my U. S. Patent No. 1,029,737, referred to. It contains no free formaldehyde as stated, and should be completely dehydrated, which can be accomplished by heating to a temperature of at least 400° F. The methylene-containing hardening agent is preferably either a polymerized formaldehyde, such as di-oxymethylene or tri-oxymethylene, or a mixture of the two, or a methylene-amin salt, such as hexa-methylene-tetra-amin. I also prefer to incorporate in the composition a relatively small amount of free phenol or cresol, which acts as a thinning ingredient, and for various purposes a solid solvent may also be added. Suitable proportions for my improved composition are shown by the following examples:—

(1). 100 parts phenol resin or equivalent shellac substitute, 0 to 20 parts of free phenol or cresol, 7 to 15 parts of anhydrous polymerized formaldehyde (dioxymethylene, tri-oxymethylene, or a mixture of the two), 100 to 150 parts acetylene-tetra-chlorid.

(2). 100 parts phenol resin or equivalent shellac substitute, 0 to 20 parts phenol or cresol, 7 to 15 parts hexa-methylene-tetra-amin, 100 to 150 parts acetylene-tetra-amin.

(3). 100 parts phenol resin or equivalent shellac substitute, 0 to 20 parts phenol or cresol, 7 to 15 parts of either anhydrous polymerized formaldehyde or hexa-methylene tetra-amin, 100 to 150 parts acetylene-tetra-chlorid, 10 to 100 parts anhydrous alcohol, (methyl, ethyl or amyl).

Various of the solid solvent elements referred to, such as are mentioned in my French patent, may also be added to the composition in proportions which may vary between 0 and 50 per cent. of the weight of the phenol resin used. Among these solid solvents may be mentioned benzoic acid and its anhydrid, phthalic acid and its anhydrid, chloro-naphthalenes, such as mono-chloro naphthalene, chloro-phenols, such as tetra-chloro-phenol, and chloro and nitro derivatives of naphthalene, such as mono-nitro naphthalene and the various derivatives. These and equivalent substances remain in the product after it has been hardened by application of heat, as solid solvents of the same, remove internal stresses and give the product the property of becoming sufficiently plastic when reheated to readily take an impression from a die or mold. These various bodies modify the lacquer and give it suitable characteristics for special purposes. The amount of acetylene-tetra-chlorid may vary from the equivalent weight of the phenol resin to a considerably larger proportion according to the viscosity of thickness of the lacquer required. One and one-half times the weight of the phenol resin seems to be the greatest proportion in which the acetylene-tetra-chlorid should be used. The character of the mixture determines the amount of the volatile solvent which may be used. The resin alone will only take up substantially an equal weight of the solvent, when it is not heated, that is, at room temperatures. When equal parts of the phenol resin and the solvent are heated together, together with the methylene-containing hardening agent for the resin, a sufficiently thin fluid is formed for the purposes of the invention. If the composition is not, however, to be used heated, equal parts of resin and solvent would make a composition too thick for most purposes unless other ingredients were added to thin the same. The free phenol and solid solvent if used, and anhydrous alcohols, or other water-free volatile solvents, such as those mentioned, have this effect.

The acetylene-tetra-chlorid, as stated, is soluble in certain proportions, in the phenol resin, the proportion going into solution depending on the temperature used. This proportion may be increased, as indicated, above the limits stated, if the other ingredients referred to, or some of them, are added.

The water-free solvents such as those mentioned by me, other than acetylene-tetra-chlorid, may be used as stated, with good effects, but are not as good as the acetylene-tetra-chlorid. All of them are inflammable. The anhydrous alcohols absorb water during drying, and have low boiling points which do not permit of rapid removal of the solvent by heat without injuring the product by bubbling. When these substances are mixed with acetylene-tetra-chlorid, however, within the proportions indicated, these injurious effects are eliminated. Amyl alcohol, fusel oil and oil of mirbane, give off disagreeable and injurious vapors, and dry slowly, because of their low volatility.

To form the varnish, phenol resin or equiv alent substance is melted and mixed with the desired solid solvent, if one is to be used, and also with the free phenol if it is to be used, and the acetylene-tetra-chlorid is added to the mass while the latter is maintained at a temperature of 220° F. The paraformaldehyde, hexa-methylene-tetra-amin or other hardening agent for the resin may then be added to the mass at the same or at a lower temperature. Reaction between the phenol resin and the hardening agent will not ensue if the temperature is allowed to drop as soon as the ingredients are mixed. Articles coated with this lacquer may be given a rapid heat treatment in an oven heated to 220° F. and allowed to harden at this temperature by reaction between the methylene-containing agent and the phenol resin, or they may be treated rapidly at 220° F. or thereabout, and the temperature raised after a short time to about 240° F. and the lacquer permitted to harden at this temperature. There will be no bubbling of the mass during the hardening reaction, since the polymerized form of formaldehyde, if used, is present in no greater proportion than sufficient to combine with the phenol resin and any free phenol which may be present. If hexa-methylene-tetra-amin is used as the hardening agent an excess of the latter above the reacting proportion will not cause bubbling. Furthermore, there is no water in the mass to be evolved and cause bubbling. If certain solid solvents are used, such as phthalic or benzoic or other organic acid anhydrids, the same will perform the function of chemically combining any traces of water which may be evolved during the hardening reaction, if paraformaldehyde is used as the methylene-containing agent. Furthermore, if hexa-methylene-tetra-amin is used as the methylene-containing agent, these organic acid anhydrids and also tetra- or penta-chloro-phenols, if used, will combine with any ammonia evolved by the hexa-methylene-tetra-amin during the reaction, as described in my French patent referred to.

A lacquer such as described, is admirably adapted for forming the record surface of duplicate sound records and for many other purposes in which a baking enamel is required.

Having now described my invention what I claim as new and desire to protect by Letters Patent is:—

1. An enamel or varnish composition, comprising a solution of a fusible phenol resin and a methylene-containing hardening agent therefor, a fluid thinning ingredient, and acetylene-tetra-chlorid, substantially as described.

2. An enamel or varnish composition, comprising a solution of an anhydrous fusible soluble phenol resin and an anhydrous methylene-containing hardening agent therefor, in a water-free solvent for both of the above which volatilizes readily, but does not boil at the reaction temperature of the phenol resin and the said hardening agent therefor, substantially as described.

3. An enamel or varnish composition, comprising a solution of a fusible phenol resin, a small percentage of methylene-containing hardening agent therefor, and of free phenol, and a solid solvent element, all dissolved in a water-free non-inflammable volatile solvent therefor, substantially as described.

4. An enamel or varnish composition, comprising a solution of phenolic and methylene-containing substances of such a nature and in such proportion as to be adapted to react upon application of sufficient heat to form an infusible phenolic condensation product, a fluid thinning ingredient and acetylene-tetra-chlorid, substantially as described.

5. An enamel or varnish composition, comprising a solution of fusible phenol resin, a small percentage of hexa-methylene-tetra-amin and of free phenol, all dissolved in acetylene-tetra-chlorid, substantially as described.

6. An enamel or varnish composition, comprising a solution of fusible phenol resin, a small percentage of hexa-methylene-tetra-amin and of free phenol, all dissolved in a water-free volatile solvent therefor, substantially as described.

7. An enamel or varnish composition, comprising a solution of an anhydrous fusible, soluble phenol resin and anhydrous hexa-methylene-tetra-amin in a water-free solvent therefor which volatilizes readily but does not boil at the reaction temperature of the said resin and hexa-methylene-tetra-amin, the said resin, hexa-methylene-tetra-amin and solvent being in such proportions that at room temperatures a thinly-fluid solution is formed, substantially as described.

8. An enamel or varnish composition, comprising a solution of 100 parts of fusible phenol resin, and from 7 to 15 parts of a methylene-containing hardening agent therefor, in 100 to 150 parts of acetylene-tetra-chlorid, substantially as described.

9. An enamel or varnish composition, comprising a solution of a mixture of a fusible phenolic resin, and a methylene-containing substance which combines with the same on application of heat to harden it, a fluid thinning ingredient and a water-free volatile solvent for all of the above, substantially as described.

10. The process of preparing an enamel or varnish composition, consisting in melting a phenol resin, dissolving therein acetylene-tetra-chlorid at a temperature of about 220° F., dissolving a methylene-containing hardening agent for the phenol resin in the mass, and causing the temperature of the mass to become reduced before a hardening reaction takes place between the resin and the hardening agent thereof, substantially as described.

This specification signed and witnessed this 20th day of July, 1911.

JONAS W. AYLSWORTH.

Witnesses:
DYER SMITH,
HENRY SHELDON.

It is hereby certified that in Letters Patent No. 1,102,632, granted July 7, 1914, upon the application of Jonas W. Aylsworth, of East Orange, New Jersey, for an improvement in "Enamel Lacquer or Varnish Compositions," errors appear in the printed specification requiring correction as follows: Page 1, line 60, for "Belgian" read *French;* same page, line 99, for "oid" read *oil;* and that the said Letters Patent should be read with these corrections therein that the same may conform to the record of the case in the Patent Office.

Signed and sealed this 4th day of August, A. D., 1914.

[SEAL.]                                                    J. T. NEWTON,

*Acting Commissioner of Patents.*